United States Patent [19]

Wohead

[11] Patent Number: 4,693,030
[45] Date of Patent: Sep. 15, 1987

[54] LUMINESCENT FLOATING SINKER

[76] Inventor: Michael J. Wohead, P.O. Box 295, Naperville, Ill. 60566

[21] Appl. No.: 834,767

[22] Filed: Feb. 28, 1986

[51] Int. Cl.$^4$ ............................................. A01K 95/00
[52] U.S. Cl. ................................... 43/42.22; 43/43.1; 43/43.14
[58] Field of Search ................... 43/43.1, 42.31, 42.4, 43/43.14, 44.96, 44.97, 42.33, 42.22

[56] References Cited

U.S. PATENT DOCUMENTS

| 2,563,522 | 8/1951 | Fisher | 43/42.33 |
|---|---|---|---|
| 2,841,916 | 7/1958 | Ueda | 43/44.96 |
| 3,010,244 | 11/1961 | Mattingly | 43/43.14 |
| 3,670,447 | 6/1972 | Wohead . | |
| 3,708,903 | 1/1973 | Bercz et al. | 43/42.33 |
| 3,783,549 | 1/1974 | Griggs | 43/44.97 |
| 3,918,190 | 11/1975 | Hornbeck | 43/17.6 |
| 3,935,659 | 2/1976 | McCallum | 43/17.6 |
| 3,996,689 | 12/1976 | Lawless | 43/44.97 |
| 4,215,506 | 8/1980 | LeBoeuf | 43/42.33 |

FOREIGN PATENT DOCUMENTS 481460  3/1952  Canada .............................. 43/44.97

Primary Examiner—M. Jordan
Attorney, Agent, or Firm—Hill, Van Santen, Steadman & Simpson

[57] ABSTRACT

A sinker for fishing lure rides upwardly in the water at a selected depth carrying the lure over snagging obstructions and emitting a luminescent glow to attract the fish. The device has a light weight transparent elongated tubular body with a sealed buoyant chamber receiving luminescent material. The bottom end of the tube is selectively weighted to sink the tube to a desired depth and bendable wire legs radiate from the bottom causing the tube to hop or skip over obstructions. The fishing lure line is attached to the top of the tube above the buoyant chamber.

12 Claims, 6 Drawing Figures

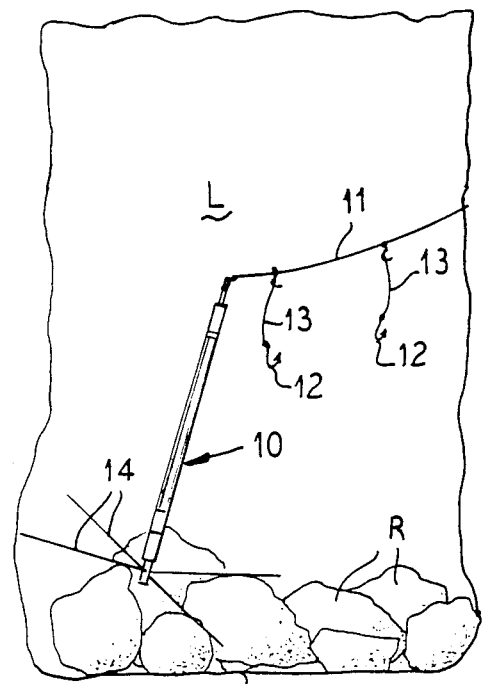
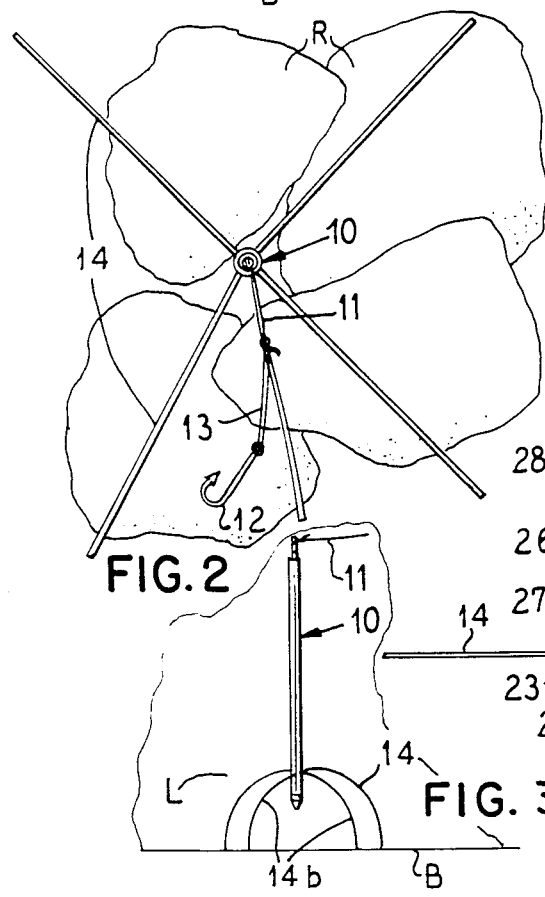
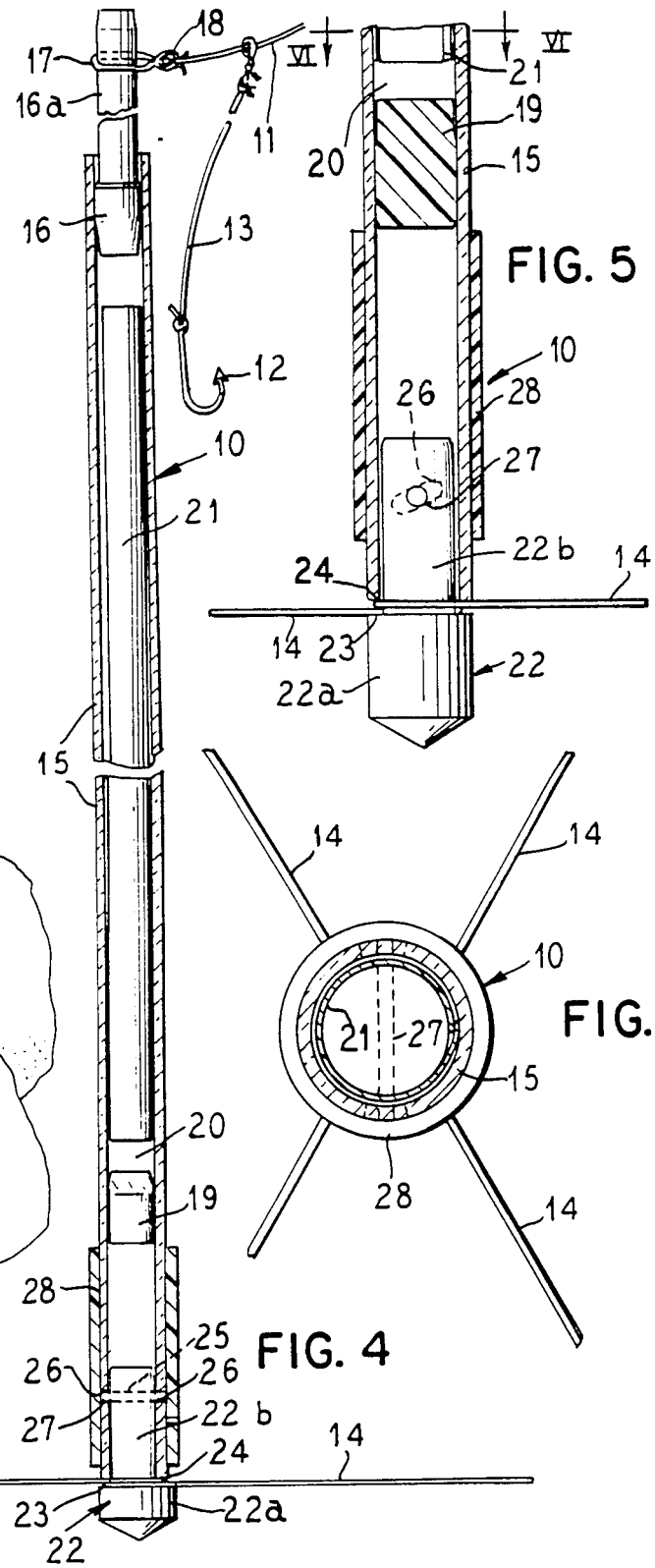
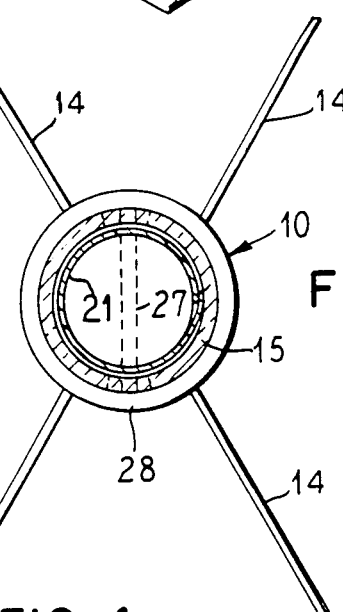

LUMINESCENT FLOATING SINKER

BACKGROUND OF THE INVENTION

1. Field of the Invention

This invention is directed to the art of sinkers for fishing lines and particularly deals with a floating type sinker which rides upright in the water, reflects or emits a fish attracting glow, and skips or hops over obstructions which snag conventional sinkers.

2. The Prior Art

My prior U.S. Pat. No. 3,670,447, issued June 20, 1972, discloses and claims a non-snagging sinker for a fishing line having an elongated tubular body with a bottom end closed by a weight and a top end closed by a means attached to the fishing line and leader of the lure. A plug in the tube separates the interior into a sealed upper air chamber and a second lower chamber receiving additional weights.

It would be an improvement in this art to cause the tube to reflect light or emit a glow thereby attracting fish, to provide single replaceable weights to cause the tube to ride upright in the water at a desired depth and to provide spider-like radiating legs on the tube extending its base so that the tube will not drop into crevices and will skip or hop over snagging obstructions in the water. The present invention achieves these desirable improvements.

SUMMARY OF THE INVENTION

According to this invention there is provided a sinker for fishing lure having an elongated body which rides upright in the water, receives the fishing line at the top end thereof, receives replaceable weights at the bottom end thereof, has a buoyant compartment with light reflective or luminescent material to reflect or emit a glow, and has thin legs projecting from the bottom to prevent it from becoming snagged by obstacles in the water. The legs can be bent to rest on the lake bottom holding the body above the bottom. The body can be tilted when placed in a hole in the ice for ice fishing to drop into position laterally of the hole for extending the range of the lure.

The elongated body is preferably a tube composed of a transparent plastics material such as a polyolefin, a polyvinyl resin or the like, is preferably about 10 to 15 inches long, about ¼ to ½ inch in diameter, has a sealed buoyant chamber extending substantially the full length of the tube containing reflective luminescent material, has a top end arranged to receive the fishing line and has a bottom end arranged to selectively receive interchangeable weights from which project spider-like wire legs. The reflective or luminscent material is preferably a tube of tape either coated with a phosphorescent glow color or having a reflective prism design reflecting light in the water. The glow color is used for night fishing. The reflective tape is used in daytime fishing.

The term "luminescent" as used herein includes phosphorescent materials which glow in the dark and materials which reflect light to shine in the water for attracting fish.

The device floats upright in the water, reflects light or glows in the dark to attract fish, sinks to a depth determined by the selected weight, and the wire legs extend the base area to prevent the tube from dropping into crevices and causing it to skip or hop over obstructions in the water. The fishing line is thus carried above the lake bottom where any type of lure, including bait, live bait such as minnows, worms, crayfish, etc., and artificial lures, will not be snagged. As used herein, the term "lure" includes all types of baits. The wire legs are thin and bendable and may vary in length of from, say, 6 to 10 inches and radiate from the weighted bottom of the tube in circumferential spaced relation at any angle. Four legs in equally spaced circumferential relation are preferred.

The replaceable weights are preferably in the form of a headed plug with a stem or shank projecting into the bottom end of the tube and having a hole therethrough receiving a removable pin extending transversely through slots in the tube and held in position by a sliding sleeve on the tube. The wire legs preferably have portions coiled around the shank and clamped between the bottom of the tube and the head of the weight.

It is then an object of this invention to improve the sinker of my prior U.S. Pat. No. 3,670,447 causing it to reflect light or glow in dark waters and having legs causing it to hop over obstructions.

A specific object of this invention is to provide a floating sinker with an elongated sealed buoyant chamber containing luminescent material.

Another object of this invention is to provide a floating sinker which rides upwardly in the water and has a sealed transparent buoyant chamber housing an elongated strip of luminescent material.

Another object of the invention is to provide a floating sinker with radiating wire legs.

A still further object of the invention is to provide a floating sinker having a tubular body with a bottom end adapted to selectively receive plugs of different weights which are anchored to the tube by a removable pin extending transversely through the tube and held by a sleeve slidable on the tube.

Other and further objects of this invention will become apparent to those skilled in this art from the following detailed description of the annexed sheet of drawings, which illustrates a best mode embodiment of the invention.

ON THE DRAWINGS

FIG. 1 is an elevational view illustrating the manner in which the floating sinker of this invention operates over the rocky bottom of a lake bed without snagging.

FIG. 2 is a top plan view of FIG. 1.

FIG. 3 is a view similar to FIG. 1 showing operation of the sinker when its legs are bent downwardly to rest on the lake bottom.

FIG. 4 is a broken longitudinal sectional view, with parts in elevation, of the floating sinker of this invention.

FIG. 5 is an enlarged vertical sectional view with parts in elevation of the bottom portion of the floating sinker of this invention showing the details of the replaceable weight plug and wire leg mounting.

FIG. 6 is a transverse sectional view along the line VI—VI of FIG. 5.

AS SHOWN ON THE DRAWINGS

In FIGS. 1 and 2, the floating sinker 10 of this invention is illustrated in operation in a lake L having rocks R on the bottom B thereof to carry a fishing line 11 above the rocks R so that fish hooks 12 on leaders 13 will be suspended above the rocks or other obstructions on the lake bottom while the legs 14 of the sinker 10 extend its base so that it will not drop into crevices between the rocks and will hop or dance over the rocks to prevent snagging.

When fishing over a relatively flat lake bottom B as shown in FIG. 3, the radiating legs 14 can be bent downwardly at 14b to hold the sinker 10 in spaced relation above the bottom B. It should be understood that the legs can be spread and bent to any desired configuration to adjust the legs to bottom conditions. The lengths of the legs can also be varied to provide a desired spread. Usually, with tubes of 10 to 15 inches in length, the legs will have a somewhat lesser length of, say, 6 to 10 inches.

As illustrated in FIGS. 4–6, the floating sinker 10 has an elongated transparent tubular plastics material body 15 which, as explained above, may be from 10 to 15 inches long and have a diameter of ¼ to ½ inch.

The top end of the tubular body 15 is closed by a plastic plug 16 cemented or otherwise sealed in the tube and having a reduced diameter pin portion 16a projecting beyond the tube with a transverse hole 17 therethrough adapted to receive the leading end of the fish line 11 which is then wrapped around the pin 16a and tied as at 18 to anchor the fish line to the upper end of the device.

The lower end of the tube is closed by a plastic plug 19 inserted into the tube about 2 inches from the bottom end thereof and sealingly secured to the tube. A sealed buoyant chamber 20 extending substantially the full length of the tube 15 between the plugs 16 and 19 is thus provided. This buoyant chamber 20 receives a length of luminescent tape 21 which is wrapped into tubular shape to stand upright in the chamber for substantially the full length thereof. This tape 21 can be composed of paper coated or impregnated with a phosphorescent glow color for night fishing, such as yellow, orange, chartreuse, or the like or can be a light reflective tape with a prism embossment of a selected bright color to amplify light in the water. Alternatively the interior of the buoyant chamber could be directly coated with a luminescent or light reflective paint. Since the tube is transparent, the luminescent material will emit a glow of light in dark waters and the reflective tape will flash light or sparkle in the water attracting the fish to the vicinity of the lures. The luminescent material can be activated by a flashlight or the like.

The bottom portion of the tube 15 below the plug 19 is open and releasably receives a selected weight 22 preferably in the form of a plug with an enlarged head 22a below the tube and a reduced diameter shank 22b snugly fitting the tube. A radial shoulder 23 is thus provided between the enlarged head 22a and the shank 22b underlying the bottom rim edge 24 of the tube. The wire legs 14 are wrapped around the shank 22b and are clamped between the shoulder 23 and the rim bottom 24.

The shank 22b has a transverse hole 25 therethrough adapted to register with diametrically opposite inclined arcuate slots 26 through the tube. A metal pin 27 inserted through these slots 26 and hole 25 secures the weight 22 to the tube and when the weight is rotated clockwise relative to the tube, the pin 27 will climb the inclines of the slots 26 to form means to tighten the clamped engagement of the wire legs between the bottom of the tube and the head of the weight.

A sleeve 28 snugly embraces the bottom end of the tube 15 selectively covering the slots 26 and locking the pin 27 against retraction. The pin has a length such that when inserted in position, its ends will be substantially flush with the outer circumference of the tube 15 so as not to interfere with the sliding of the sleeve 28. This sleeve 28 is preferably flexible plastic tubing of a somewhat resilient nature as to be stretched over the tube body 15 in tight fitting engagement therewith.

The wire legs 14 when wound around the shank 22b of the weight 22 and clamped in position as described, will project radially from the tube 15 and are spread apart to provide a broad base preventing the tube from dropping into crevices between the rocks R as shown in FIGS. 1 and 2 or can be bent downwardly as shown in FIG. 3 to support the tube above the lake bottom.

It is preferred to provide a plurality of weight and leg sizes to sink the device with the fishing lure attached to a desired depth and to extend the base to a desired span. The weight and legs are easily replaced by counter rotating the weight for moving the pin downwardly in the slots 26 thereby loosening the clamping engagement of the wire legs between the plug head and tube end. The sleeve 28 is then raised to expose the ends of the pin 27 which is then pushed through the slots and hole 25 permitting the weight to be pulled out of the tube.

From the above description it will therefore be understood that this invention provides a non-snagging floating sinker for fishing lure which glows in the dark or reflects light in the water, rides upwardly in the water, has easily replaceable weights to sink to a desired depth in the water and has extended legs providing a wide base to prevent snagging.

I claim as my invention:

1. A sinker for a fishing lure which sinker rides upright adjacent a bottom of a body of water to carry the lure over snagging obstructions, said sinker comprising an elongated light weight transparent tube having a sealed buoyant chamber, luminescent material in said chamber causing the tube to project light, said tube having a top end above said chamber with means for attachment to a fishing line, said tube having an open bottom chamber below said sealed buoyant chamber, a weight removably mounted in the open bottom chamber of said tube, and means releasably locking said weight in said open bottom chamber of the tube, said means including a pair of slots in a wall of the bottom chamber, a transverse hole in the portion of said weight, a pin extending through said slots and hole and a sleeve slidable on the tube to cover and uncover said slots so that weights of different sizes are selectively carried by said tube to carry the sinker upright at a desired depth in the water.

2. A sinker according to claim 1, which includes bendable wire legs being wrapped around the portion of the weight and radiating from said sinker adjacent the weight.

3. A sinker according to claim 2, wherein said wire legs are clamped between an end of the tube and said weight.

4. A sinker according to claim 1, wherein the luminescent material is a paper glow tape.

5. A sinker according to claim 4, wherein the glow tape is rolled into a tube.

6. A floating sinker for a fishing lure, said sinker adapted to ride upright in a body of water to carry the lure over snagging obstructions, said sinker comprising an elongated light weight transparent plastic tube having a sealed buoyant chamber extending substantially the full length of the tube, a luminescent tape sealed in said chamber causing the tube to glow in the dark or reflect light, said tube having a top end above said chamber with means for attachment to a fishing line, said tube having an open bottom end below said chamber, a weight having an enlarged head below the tube and a shank projecting into the open bottom end of the tube with a radial shoulder between the shank and head underlying the open bottom end of the tube, bendable wire legs wrapped around said shank and being clamped between the bottom end and said shoulder, said shank having a transverse hole therethrough, inclined slots in said tube registering with said hole, a pin extending through said slots and hole for securing the shank in the tube and forming means to tighten a clamping of the wire legs, a sleeve slidable on the tube to cover and uncover said slots, said wire legs being clamped between the bottom end of the tube and the shoulder when the pin is seated in said hole and said slots and said weight is rotated to draw the shoulder toward the end, said pin being removable from the slots and hole to permit removal of the weight and replacement with a heavy or lighter weight and said legs radiating from the tube to extend the base of the tube for preventing the tube from descending into crevices in a bottom of said body of water.

7. The sinker of claim 6 wherein the luminescent tape is a paper glow tape.

8. The sinker of claim 7 wherein the tape is rolled into a tube.

9. A sinker for a fishing lure which sinker rides upright adjacent a bottom of a body of water to carry the lure at a desired level above the bottom and over snagging obstructions, said sinker comprising an elongated buoyant body member having a top end with means for attachment to a fishing line and an opened bottom end, a weight having a shank received in the opened bottom end and a head forming a shoulder, means for removably mounting the weight in said bottom end so that a fisherman can select the size of the weight to cause the body member to ride upright adjacent the bottom of the body of water, and bendable wire legs being wrapped around said shank and radiating from said bottom end to extend a base of the body member to prevent snagging of the body member on obstructions in the water so that a lure attached to the fishing line will be carried above snagging obstructions and said bottom of said body of water, said means for mounting the weight include means to tighten the clamping of the wire legs between the shoulder and bottom end including a pair of inclined slots in the wall of the opened bottom end, a transverse hole in the shank and a pin extending through the slots and hole so that by rotation of the weight relative to the bottom end the wire legs are tightly gripped.

10. A sinker according to claim 9, wherein the buoyant body member is a hollow tube containing a buoyant chamber receiving a tape of luminescent material.

11. A sinker according to claim 10, wherein said luminescent tape is a paper glow tape.

12. A sinker according to claim 10, wherein a luminescent tape is a light reflective tape of prism embossments.

* * * * *